United States Patent
Arno et al.

(10) Patent No.: US 9,612,051 B2
(45) Date of Patent: Apr. 4, 2017

(54) HEAT REACTIVATED PROCESS FOR DESICCANT AIR DRYER SYSTEMS USING BLOWER PURGE AND METHOD THEREFORE

(71) Applicant: Vincent G. LoTempio, Clarence, NY (US)

(72) Inventors: Raymond Arno, Clarence, NY (US); John A. Carlin, Buffalo, NY (US)

(*) Notice: Subject to any disclaimer, the term of this patent is extended or adjusted under 35 U.S.C. 154(b) by 736 days.

(21) Appl. No.: 13/764,292

(22) Filed: Feb. 11, 2013

(65) Prior Publication Data
US 2014/0223767 A1    Aug. 14, 2014

(51) Int. Cl.
*B01D 53/26* (2006.01)
*F26B 21/08* (2006.01)
*B01D 53/04* (2006.01)

(52) U.S. Cl.
CPC ........ *F26B 21/083* (2013.01); *B01D 53/0462* (2013.01); *B01D 53/261* (2013.01); *B01D 2257/80* (2013.01)

(58) Field of Classification Search
CPC .. B01D 53/04; B01D 53/0462; B01D 53/261; B01D 2257/80; F26B 21/083
USPC .......... 96/112, 113, 116, 117, 121, 126, 127, 96/144, 146; 34/549, 524, 80, 472, 473; 95/14, 15, 18, 19, 22
See application file for complete search history.

(56) References Cited

U.S. PATENT DOCUMENTS

| | | | |
|---|---|---|---|
| 5,485,686 A * | 1/1996 | Sears, Jr. | 34/473 |
| 5,632,802 A | 5/1997 | Grgich et al. | |
| 6,099,620 A | 8/2000 | Arno et al. | |
| 6,447,583 B1 | 9/2002 | Thelen et al. | |
| 7,000,332 B1 * | 2/2006 | Fresch et al. | 34/330 |
| 8,986,433 B2 * | 3/2015 | Carlin et al. | 96/111 |
| 2004/0040172 A1 * | 3/2004 | Crawford | 34/330 |
| 2012/0132070 A1 * | 5/2012 | Matsuba et al. | 95/10 |

* cited by examiner

*Primary Examiner* — Frank Lawrence
(74) *Attorney, Agent, or Firm* — Vincent G. LoTempio; Kloss, Stenger & LoTempio; David Stephenson

(57) ABSTRACT

The present invention provides a system for effectively purging heat regenerating desiccant compressed air dryers from a moisture load, by a 'tuned' regenerating means with the use of a variable restriction on the blower purge air flows, a blower back-pressure set point, a heater discharge temperature set point, and a bottom area bed temperature of a vessel containing desiccant, a means to balance purge temperature to a stable, noncycling state preventing an under and overheating heating of desiccant, vessel and associated piping. A valve control means to terminate heating, cooling and dry purge operations selectively operated to allow purge flows to quickly cause water vapor captivated by the desiccant (in a drying cycle) to be released and purged out of the vessel (in a regeneration cycle), resulting in a regenerated tower vessel prepared for a compressed air drying cycle.

19 Claims, 5 Drawing Sheets

HEAT REACTIVATED PROCESS FOR DESICCANT AIR DRYER SYSTEMS USING BLOWER PURGE AND METHOD THEREFORE

CROSS REFERENCE TO RELATED APPLICATIONS

This application claims the benefit of U.S. Provisional application of Raymond P. Arno and John A. Carlin, Ser. No. 61/597,108, filed 9 Feb. 2012, having the title IMPROVED HEAT REACTIVATED PROCESS FOR DESICCANT AIR DRYER SYSTEMS USING BLOWER PURGE AND METHOD THEREFORE, which is incorporated herein by reference in its entirety.

FIELD OF THE DISCLOSURE

The present disclosure relates generally to the field of desiccant air dryer systems, and more particular to the regeneration process in blower purging the system of absorbed moisture captured during its operating cycle.

BACKGROUND

In the field of industrial machinery, there exists a need for 'dry' air in the process of operating air driven devices, product process and fabrication, etc. in countless applications and scenarios. Air and pressurized 'compressed' air in particular, is laden with moisture that negatively impacts its effectiveness in the above mentioned uses and processes; making costly equipment failure and 'befouled' product. 'Desiccant dryers' are one of the prime methods that remove substantially the moisture from air for such industrial uses, thus reducing failures and improving product quality.

U.S. Pat. No. 6,099,620 ('620) issued to Arno et al., teaches the use of parallel inlet ports to directly communicate with side walls of the desiccant vessel and with the interior of the desiccant bed. The system was effective in delivering purge air to the stratified regions of the desiccant bed most laden with moisture. U.S. Pat. No. 6,447,583 issued to Thelen et al., taught the use of a rotating drum and a high speed blower for boosting pressure of the regeneration exhaust stream and a gas control valve to change flow rates. The Thelen patent teaches a highly mechanical system with a series of complicated belts, motors and rotating mechanisms. U.S. Pat. No. 5,632,802 issued to Grgich et al., teaches an air filter affixed to a blower used to communicate with a heater, valves and desiccant bed.

None of the above approaches discloses a means for thermally balancing (tuned-regeneration) the vessel containing desiccant during a purge phase of regeneration, particularly smoothing the purge temperature to a consistent 'set point' temperature that does not wildly swing positive and negative from set point. Further none of the above approaches sets forth a method to complete a regeneration having less time in the process and thus less wear and tear of the equipment. Finally, none of the prior art addresses the energy savings related to an efficient means of operating a quality air drying apparatus.

Thus, a heretofore unaddressed need exists in the industry to address the aforementioned deficiencies and inadequacies.

SUMMARY

A primary object of the present invention is an improved process to control blower purge air flow with a variable restriction means, making the heater and blower capacity all ideally matched. Having capability to tune blower purge flows discharging from a heater and directed over a moisture laden desiccant bed to affect a thermal balance of heat, which evenly eliminates accumulated moisture from desiccant material in a vessel of an air dryer apparatus wherein saturated layers are stratified, in the process of regenerating of the desiccant.

Another object of the present invention is to stabilize temperature swings by means of adjusting a variable restriction to tune heater discharge, to the exact requirements based on the physical unique design of the desiccant bed, heater capacity and blower flow velocity.

Another object of the present invention is to effect the purge phase in a balanced thermal environment which reduces excessive overheating or under heating of localized vessel areas, desiccant and related piping; fully reducing the possibility of developing dew point bumps. To control heat energy by making the purge air flow process a less wasteful and potentially less damaging to the desiccant material.

Still another object of the present invention is to reduce energy consumption as it relates to regeneration and purging the loaded moisture in the bed of desiccant and to allow the apparatus to be back in service to a drying mode of operation in less time. To make available the dryer apparatus for service in a 'dryer' mode for its intended use in less time.

Yet another objective of the present invention is to reduce or eliminate the effects of blower re-loading the desiccant, as the result of using the blower to cool the desiccant bed.

Finally, another objective of the present invention is to reduce wear and tear of the equipment by eliminating high cyclical operation of heater contactors, thus greatly reducing the potential of costly repairs or replacement of both the heater and/or the contactors.

The present invention takes advantage of all these objectives by variably restricting blower flows to manage purge air stabilization in the process of regenerating the desiccant bed, while effectively eliminating the creation of negative dew point bumps by inherent blower loading. The disadvantages listed earlier are overcome and the desiccant bed is renewed without overheating or under heating, without excessive equipment cycling and wear and tear, and, without negative effects.

The above and other objects are accomplished in accordance with the present disclosure by provision of an improved heat regenerated desiccant gas dryer and method of regeneration comprising: a means to variably restrict blower purge air flows to a bed of desiccant within at least one tower vessel within said air dryer; wherein said purge air flow is selectively directed to at least one vessel containing desiccant; a means to measure and control blower discharge flow pressures, heater outlet flow temperatures, desiccant bed bottom area temperature, dry purge for cooling, and dew point; where the means to variably restrict blower purge air flows having adjustment capability to tune the air dryer during a heating phase of regeneration so that the vessel tower size, the mass of desiccant within the vessel, heater and blower capacity are matched. The variable restriction means allows for flow control and blower purging at a stable purge temperature so that the air dryer does not cycle during heating phase in regenerating the desiccant thus enabling the system to be cooled and repressurized and returned to a dryer mode cycle of operation.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
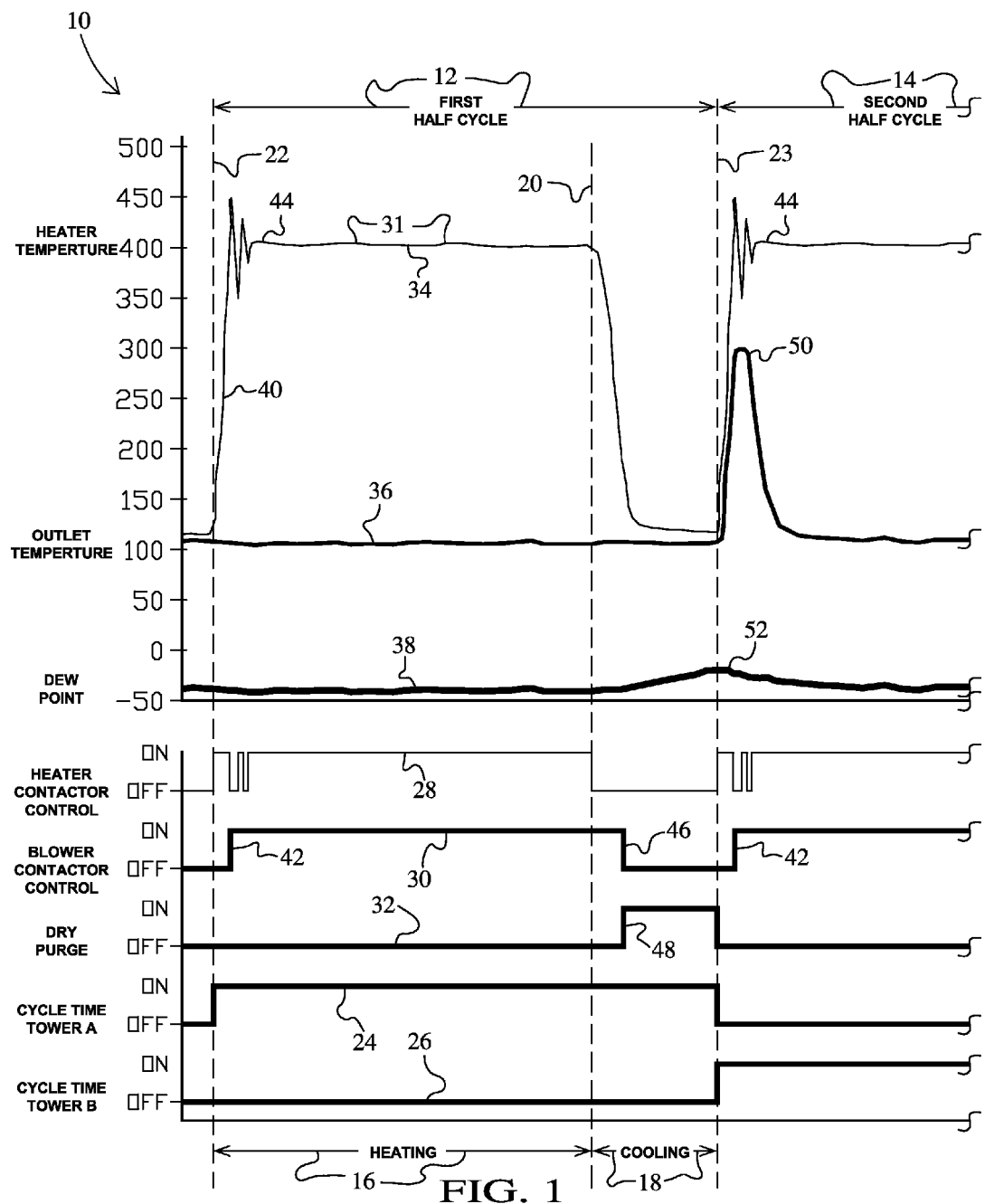
FIG. 1 is a graph illustration of the present invention showing all related waveforms represented in time, of a purge/regeneration cycle and the immediate effects thereafter.

Reference is now made in detail to the description of the embodiments as illustrated in the drawings. While several embodiments are described in the connection with these drawings, there is no intent to limit the disclosure to the embodiment or embodiments disclosed herein. On the contrary, the intent is to cover all alternatives, modifications, and equivalents.

It should be clearly understood that like reference numerals are intended to identify the same structural elements, portions, or surfaces consistently through out the several drawing figures, as may be further described or explained by the entire written specification of which this detailed description is an integral part. The drawings are intended to be read together with the specification and are to be construed as a portion of the entire "written description" of this invention as required by 35 U.S.C. §112.

Desiccant air drying systems typically are comprised of a pressure vessel filled with 'desiccant' material, a means of valves and piping to control air flow throughput and a purge means. These systems may have other useful features such as filters to remove oil and dirt, screens to contain the desiccant within the vessel, electric motor or air driven actuators and solenoids, electronic controls and 'liquid' condensate draining devices as well as other features. Many configurations of desiccant air dryers are constructed of 'dual' components so that the apparatus may be 'on-line' using one set of components while the second set is purging itself of captured moisture.

The purging process represents a significant amount of time and operating cost either in the functioning of heaters and/or blowers, or dry purge (the use of a small portion of dry air from the on-line tower to purge), to extract the collected moisture from the desiccant material during its drying phase. This regenerating process can take several hours to effect and represents typically fifty percent of the duty cycle of the dryer system, e.g., typically 4 hours 'on-line' drying compressed air and 4 hours 'off-line' regenerating, cooling and repressurizing (depending of the capacity/size of the system and air volume.) There are many other factors acting on a purge process. For example, 'dusting' of the desiccant due to excessive air velocity, moisture load velocity, radiant heat loss, contact time, fluidization, etc.; all in a balance between loading and purging the system, etc., which makes this art difficult to do well at best, and fraught with undesirable side effects which is most typical, at worst.

Part of the problem stems from the excessive amount of heat necessary to dry the desiccant during the regeneration phase. Heated purging air is injected into the pressure vessel containing the moisture loaded desiccant material at one end and is forced over the desiccant as it goes through to the other end. The captivated moisture, attached to the desiccant, is more concentrated in the stratified layers at the 'air entry' end of the vessel, and, less moisture laden in the layers at the 'air exit' end of the vessel. The bottom end is the air entry end during the air drying phase of a cycle while the top end is the air entry end during the moisture purge regeneration phase of a cycle in a "up-flow drying" system configuration. Conversely, the top is the air entry end during the air drying phase of a cycle while the bottom end is the air entry end during the moisture purging regeneration phase of a cycle in a "down-flow drying" system. Either way, the temperatures involved, for example, may be 350 to >650 degrees Fahrenheit at the entry end while only being less than 200 degrees Fahrenheit at the air exit end of the vessel during the regenerizing process. It is important to understand that the stratified layers of temperature and moisture can substantially become imbalanced and can result having hotter layers 'hot spots' between colder layers along with more moisture laden layers between dryer layers.

This imbalance leads to higher temperatures in 'vessel heating' during the period of time it takes to fully purge substantially all the moisture from throughout the desiccant. One negative result of this phenomena is overly dried desiccant at one end and requires a longer period of time to 'cool down' the vessel before it is suitable for use again in the drying phase of the cycle. A second negative result is a dew point bump; where moisture laden air remains in the desiccant bed due to unintended loading from the blower purging process. Still another negative result is an outlet temperature spike due to the 'hot spots' in the stratified layer of desiccant within the bed, as air is pushed out of the system as 'dry air' that could cause problems in its on-line use. This hot air discharge is particularly an issue with filters downstream from the dryer; even causing said filters to burn and disintegrate over time.

Having excessive heating and operating blower motors a sufficient amount of time, cost in terms of energy during the regenerating purge process. The heater is cycled ON and OFF in an attempt to regulate a Heater Temperature Set Point. Such process can 'swing' as much as plus or minus 75 degrees Fahrenheit. This action results in not only uneven heating, but shorter life of the equipment (electrical contactors, heater elements, etc). Further, the amount of time necessary to accomplish a proper regeneration (heating, cooling, dry purge and re-pressurizing) during regenerating cycle costs in terms of the apparatus being out of service.

Solution to the Problem

The efficacy of a regeneration cycle phase in the moisture purging of desiccant air dryer systems directly relates to an effective method of passing purge air through the vessel containing the moisture laden desiccant. The relationship between the purge air entry layers of desiccant and the air exit layers can be brought into balance with respect to a more evenly distributed 'heating' (or air flow) process. A process that in effect 'tunes' the purge air temperature to the exact physical design of the system, e.g., size of the desiccant bed, heater capacity and blower purge flow. In such a scheme, the blower flow of purge air is 'variably restricted' to control and maintain a constant purge temperature which will effectively eliminate the negative effects prevalent in prior art.

The above and other objects are accomplished in accordance with the present disclosure by provision of a system for regenerating desiccant in an air dryer comprising: a means to variably restrict blower purge air flows to a bed of desiccant within at least one tower vessel within said air dryer; wherein said purge air flow is selectively directed to at least one vessel containing desiccant; a means to measure and control blower discharge flow pressures, heater outlet flow temperatures, desiccant bed bottom area temperature, dry purge for cooling, and dew point; where the means to variably restrict blower purge air flows having adjustment capability to tune the air dryer during a heating phase of regeneration so that the vessel tower size, the mass of desiccant within the vessel, heater and blower capacity are matched. The variable restriction means allows for flow control and blower purging at a stable purge temperature so that the air dryer does not cycle during heating phase in regenerating the desiccant thus enabling the system to be cooled and repressurized and returned to a dryer mode cycle of operation.

The present disclosure provides structure to effect a more efficient means to balance the thermal/air flow conditions in the regenerating process of a vessel containing desiccant material, of an air dryer system. The result of this unique approach, reduces the amount of time to substantially purge all moisture from the desiccant thus saving energy, and, eliminates heater cycling which reduces equipment wear and tear. Further, the undesirable effect of overheating the one end of the vessel is reduced or eliminated, making the regeneration phase of the cycle complete and cooled faster so the unit is ready for service in less time, as compared to the conventional process of air dryer purge cycles. And finally, the system of the present invention has greater assurance that no dew point bump can develop due to consequential blower loading.

Adverting now to the drawings, with reference to FIG. 1 is a waveforms graphic illustration 10 of both general 'state' and analog data, that would be produced from a twin tower compressed air dryer system of the present invention; illustrating a first half cycle 12 and a second half cycle 14. The second half cycle is only partially shown to make the illustration more clear in its presentation. The first half cycle 12 has a heating phase 16 and a cooling phase 18 (the second half cycle also has identical heating and cooling phases but are not referenced). A delineation dashed line 20 indicates the time when the heating phase ends and the cooling phase begins. Further, a first and second half cycle start/end time lines 22 & 23 dashed line indicate the starting point and ending point for each half cycle period.

States of operations are shown in a cycle time tower 'A' 24 waveform, a cycle time tower 'B' 26 waveform, a heater contactor control 28, a blower contactor control 30 and a dry purge control 32, as the mode/phases of operation waveforms. Waveforms 24, 26, 28, 30 and 32 are represented conventionally as active 'ON' being high and inactive 'OFF' as being low. Analog data are shown in a heater temperature 34 waveform, an outlet temperature 36 waveform and a dew point 38 waveform. Waveforms 34, 36 and 38 are presented as various temperatures that would be produced as time progresses through the cycles. It would be obvious to anyone skilled in reading data graphs that all waveforms would result as mechanical sequences the functions in the dryer system, as will be disclosed later.

It is important to note a fast rise-time 40 of heater temperature 34 waveform is due to a retarded start 42 of the blower, as shown on blower contactor control waveform 30. Also that the heater waveform 34, is largely a stable set point 31.

In operation, the first half cycle 12 starts sequence as cycle time tower 'A', in waveform 24, and heater contactor control 28 becomes active at the first half cycle start/end time-line 22 cycle indications. Because the blower operation has retarded start 42, the heater can achieve a fast rise-time 40 before reaching a desired heat set point 44 (for example a set point 31 of 400 degrees Fahrenheit). No blower air flow over the heater elements allows the heater to come to set point temperature very quickly.

Heating phase 16 continues until the end of the sequence at delineation dashed line 20, where upon the cooling phase begins. The blower continues to operate a portion of the cooling phase and finally turns off at blower OFF 46 indication. The remaining cooling phase 18 is achieved with dry purge ON 48 indication. The first half cycle 12 ends and the second half cycle starts at start/stop time-line 23. The outlet temperature has a heat spike 50 which resulted as the system switched to the tower 'A' for dryer (and tower 'B' for regeneration). This heat spike phenomenon is due to any residual heat remaining in the desiccant bed after a regenerating process of tower 'A'. It is important to note that there is no or little dew point bump, at reference 52. Where the example dew point of −40 degrees Fahrenheit had worsened near the end of first half cycle 12 as the drying tower 'B' was running out of drying capacity (as indicated on the waveform 38 to be in the area of −20 degrees Fahrenheit), this is normal. The newly regenerated tower 'A' coming on-line for drying, in the second half cycle, has restored the dew point back down to the desired −40 degree area with no, or barely discernible dew point bump. More will be discussed about FIG. 1 later, after prior art and the mechanical aspects of the present invention are disclosed.

Figure 2:
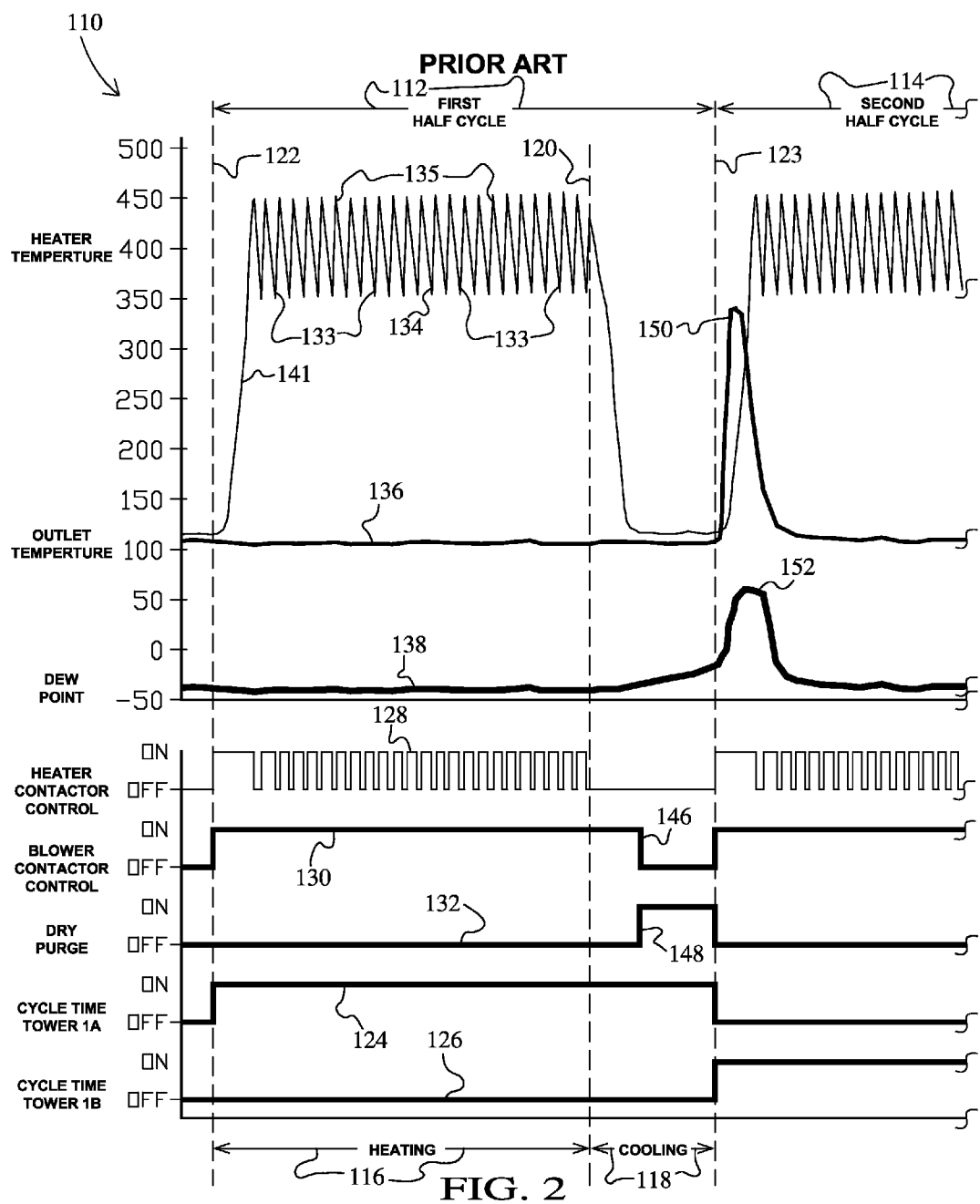
FIG. 2 is a graph illustration of the prior art showing all related waveforms represented in time, of a purge/regeneration cycle and the immediate effects thereafter.

In FIG. 2, is shown a waveforms graphic illustration 110 of both general 'state' and analog data, that would be produced from a twin tower compressed air dryer system of a typical prior air configuration; illustrating a first half cycle 112 and a second half cycle 114. The second half cycle is only partially shown to make the illustration more clear in its presentation. The first half cycle 112 has a heating phase 116 and a cooling phase 118 (the second half cycle also has identical heating and cooling phases but are not referenced). A delineation dashed line 120 indicates the time when the heating phase ends and the cooling phase begins. Further, a half cycle start/end time-lines 122 & 123 dashed line indicate the starting point and ending point for each half cycle period.

States of operations are shown in a cycle time tower 'A' 124 waveform, a cycle time tower 'B' 126 waveform, a heater contactor control 128, a blower contactor control 130 and a dry purge control 132, as the mode/phases of operation waveforms. Waveforms 124, 126, 128, 130 and 132 are represented conventionally as active 'ON' being high and inactive 'OFF' as being low. Analog data are shown in a heater temperature 134 waveform, an outlet temperature 136 waveform and a dew point 138 waveform. Waveforms 134, 136 and 138 are presented as various temperatures that would be produced as time progresses through the cycles. It would be obvious to anyone skilled in reading data graphs that all waveforms would result as mechanical sequences the functions in the dryer system, as will be disclosed later.

In operation, the first half cycle 112 starts sequence as cycle time tower 'A', in waveform 124, and heater contactor control 128 becomes active at start/end time-line 122 cycle indications. Note that the heater contactor control 128 and the blower contactor control 130 has both activated at the start/end time line 122, and heater temperature waveform 134 has a very slow rise time 141 to attempt achieving set point temperature (in the example, set point temperature is 400 degree Fahrenheit). Also the set point temperature is really never fully stable because it is constantly overshooting 135 and undershooting 133. This over and undershooting (hunting) can easily span 100 to 150 degrees Fahrenheit. This is due to the blower air flow over the heater elements, cooling it in effect. It will take substantial time for the heater to overcome such cooling, and when it does will overshoot the desired set point. When overshoot 135 occurs, the system has no choice but to turn the heater contactor 128 OFF, eventually resulting in a undershoot 133, and the undesirable hunting cycle continues.

Heating phase 116 continues until the end of the sequence at delineation dashed line 120, where upon the cooling phase begins. The blower continues to operate a portion of the cooling phase and finally turns off at blower OFF 146 indication. The remaining cooling phase 118 is achieved with dry purge ON 148 indication. The first half cycle 112 ends and the second half cycle starts at start/stop time-line 123. The outlet temperature has a heat spike 150 to 350 degree Fahrenheit which resulted as the system switched to the tower 'A' for dryer (and tower 'B' for regeneration). This heat spike phenomenon is due to any residual heat remaining in the desiccant bed after a regenerating process of tower 'A' and the direct result of the over & undershooting the heater temperature. Further, it is important to note that there is a substantial dew point bump 152. The example, shows the dew point of −40 degrees Fahrenheit had worsened near the end of first half cycle 112 as the drying tower 'B' was running out of drying capacity (as indicated on the waveform 138 to be in the area of −20 degrees Fahrenheit), this is normal. The newly regenerated tower 'A' coming on line for drying, in the second half cycle, and the dew point rose up to the +50 degree area making a substantial, highly undesirable dew point bump for a considerable amount of time. More will be discussed about FIG. 2 later, after prior art and the mechanical aspects of the present invention are disclosed.

Figure 3:
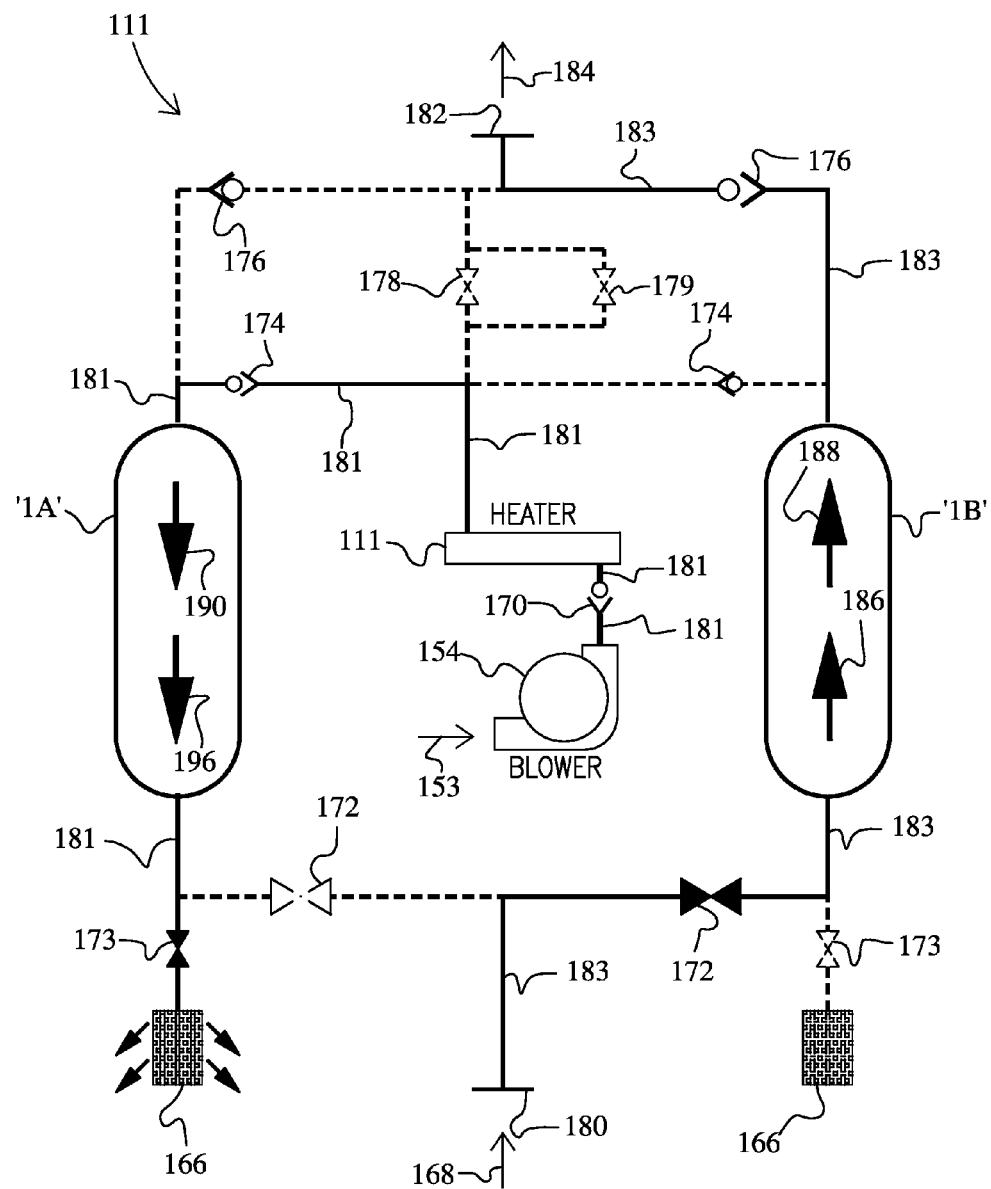
FIG. 3 is a component diagram of a prior art apparatus that could produce the waveforms illustrated in FIG. 2, showing the flows of both the purging/regenerating vessel and the drying dryer.

In FIG. 3 is a component diagram of a prior art apparatus that could produce the graphic illustration 110 waveforms demonstrate in FIG. 2, showing the flows of both the purging/regenerating and drying processes. Tower vessels '1A' & '1B' containing desiccant, blower 154, heater 158, exhaust mufflers 166, inlet valves 172, exhaust valves 173, purge check valves 174, outlet check valves 176, dry purge valve 178 and repressurization valve 179 generally comprise the prior air compressed air dryer system. The dryer has a moist compressed air dryer inlet port 180 and a dry compressed air dryer outlet port 182. Arrow 168 indicates to moist compressed air in flow, and arrow 184 indicate to dried compressed air out flow, of the dryer system 111.

Other typical components such as controllers, solenoids, actuators, electrical contactors, pressure regulators, orifices, filters and various electrical sensors are not shown for clarity and are not needed for understanding the essence system. Flow paths are shown in solid line while the none flow, due to a valve being closed, are shown in dashed line. For illustration, the tower '1A' is being regenerated (and corresponds to the first half cycle 112, heating phase 116, cooling phase 118, of cycle time tower '1A' 126, the heater contactor control 128 and blower contactor control 130 and the dry purge 132 of FIG. 2), and, the tower '1B' is drying the system throughput of compressed air (and also corresponds to the second half cycle 114 and cycle time tower '1B' 126 of FIG. 2). Regeneration pathways 181 solid line show the purging flows, while drying throughput pathways 183 solid lines show the compressed air paths being through the system. Arrows 186 and 188 show the drying tower '1B' desiccant bed flow with the arrow 186 being more heavily moisture loaded and the arrow 188 being less loaded in a moisture stratification of the bed. Arrows 190 and 196 show the regenerizing tower '1A' desiccant bed flow with the arrow 190 being more heated (and more dry) and the arrow 196 being less heated.

When the blower 154 operation is completed, referring back to FIG. 2, the bower contactor is made inactive at blower OFF 146 reference and the dry purge is made active at the dry purge ON 148 reference. The dry purge path is now using a small portion of the exiting compressed air through dry purge valve 178. Note that the blower check valve 170 would be closed (because the blower is off) and the purge path is directed to tower '1A'. Parallel to the dry purge valve 178 is a repressurization valve 179. The repressurization valve would assist in bringing which ever tower was newly regenerated back up to line operating pressure before the half cycle time line 122 & 123 of FIG. 2 is achieved. An illustration if the dry purge paths are more fully discussed later in the patent on FIG. 5. Anyone skilled in the art of compressed air dryer operation would understand that each tower becomes either the depressurized regenerating tower or the pressurized dryer tower by manipulation of the various inlet valves 172, exhaust valves 173 associated with each tower, and, dry purge valve 178 and repressurization valve 179.

In operation, the prior art compressed air dryer system 111 has started from a quiescent 'cool' state at half cycle time-line 122; where the illustrated temperatures (heater temperature 134, outlet temperature 136 and dew point 138) are all consistent with room temperature or cooled as would be found if the system was setting unused over night or a weekend in a factory scenario, and temperature would dissipate (cool) on their own. Note that waveforms 136 and 138 do not indicate a heat spike or dew point bump (as represented as 150 and 152 respectively in the second half cycle 114 after the time-line 123). It is important to understand the these heat spikes and dew point bumps are after each such reoccurring half cycle (as the prior art dryer system 111 is continuously used) on both the first and second half cycles; exactly as indicated with references 150 and 152 after time-line 123.

Figure 4:
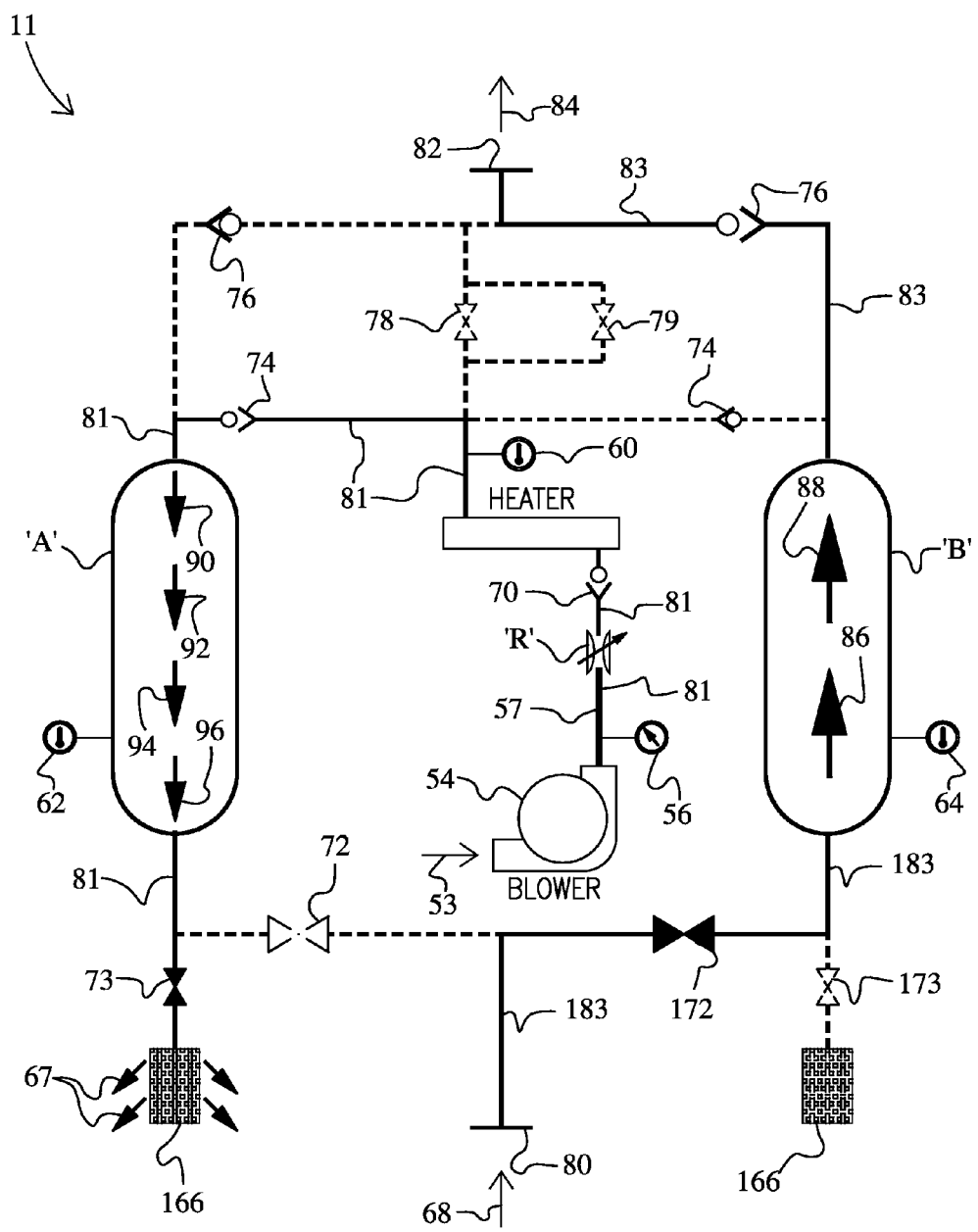
FIG. 4 is a component diagram of a present invention apparatus that could produce the waveforms illustrated in FIG. 1, showing the flows of both the purging/regenerating vessel and the drying dryer.

FIG. 4 is a component diagram of a present invention apparatus dryer system 11 that could produce the graphic illustration 10 of waveforms demonstrated in FIG. 1, showing flows of both the purging/regenerating and the drying process. A blower check valve 70, a variable restriction device a', a blower back pressure gauge 56, a heater discharge temperature sensor 60, a bottom desiccant bed temperature sensor 62 for tower/vessel 'A' and a bottom desiccant bed temperature sensor 64 for tower/vessel 'B' are disclosed. Further components of the dryer system 11 are tower vessels 'A' & 'B' containing desiccant, a blower 54, a heater 58, exhaust mufflers 66, inlet valves 72, exhaust valves 73, purge check valves 74 outlet check valves 76, a dry purge valve 78 and a repressurization valve 79 generally comprise the remaining the compressed air dryer system components of the present invention. The dryer has a moist compressed air dryer inlet port 80 and a dry compressed air dryer outlet port 82. Arrow 68 indicate moist compressed air in flow, and arrow 84 indicate dried compressed air out flow, of the dryer system 11 of the present patent.

Other typical components such as controllers, solenoids, actuators, electrical contactors, pressure regulators, orifices, filters and various other electrical sensors are not shown for clarity and are not needed to convey understanding of the invention. Flow paths are shown in solid line while the none flow, due to a valve being closed, are shown in dashed line. For illustration, the tower 'A' is being regenerated (and corresponds to the first of half cycle 12, heating phase 16, cooling phase 18, of cycle time tower 'A' 26, the heater contactor control 28 and blower contactor control 30 and the dry purge 32 waveforms of FIG. 1), and, the tower 'B' is drying the throughput of compressed air (and also corresponds to the second half cycle 14 and cycle time tower 'B' 26 waveform of FIG. 1). It is important to understand that the waveform 38 is the result of the 'dryness' of the desiccant bed of which ever tower is the active on-line drying tower.

Regeneration pathways 81 solid lines show purge air flows, while the drying throughput pathways 83 solid lines show the compressed air being dried through the system. Blower ambient air inlet is indicated by arrow 53. When the blower 54 is active ON, the variable restriction 'R' in the pathway 81, creates a back-pressure 57 that is sensed by pressure gauge 56. All downstream pathways 81 are subsequent to the 'adjustment' of the variable restriction 'R' produced by the blower flow. An example of a 1000 scfm compressed air dryer system would have a 70 cfm blower typically. To achieve the desired heater temperature 34 set point 44 of 400 degrees Fahrenheit, the heater discharge temperature of 430 degrees would be adjusted by positioning the variable restriction 'R'. In the example, a back-pressure 57 of 1.7 PSIG would be set on pressure gauge 56. An example of the variable restriction device would be a gate valve with no handle. Adjustment would be set during calibration of the heater and blower capacity adjusted to an ideal match position. The variable restriction means are disposed at the discharge of the blower to control blower flows is a manual positioning of the valve by increasing or decreasing the purge air flows entering the heater as the variable restriction means is more opened or more closed allowing more or less purge air to flow into the heater.

It is important to understand that positioning the variable restriction 'R' device, to produce a back-pressure 57, would 'tune' the regeneration process resulting in a stable heater temperature that does not overshoot or undershoot (as in prior art 135 & 133), but, results in consistent operation without unduly wear and tear, heavy cycling of the equipment. Further, it greatly reduces operating cost. In the example 1000 scfm dryer system, the tuned regeneration process of present invention would operate on 7 to 8 kW of power, whereas the same 1000 scfm prior art dryer system would consume 15 to 19 kW of power.

Referring back to FIG. 4, arrows 86 and 88 show the drying tower 'B' desiccant bed flow with the arrow 86 being more heavily moisture loaded and the arrow 88 being indicative of less moisture loaded in a moisture stratification of the bed. Arrows 90, 92, 94 and 96 show the regenerizing tower 'A' desiccant bed flow with the arrow 90 being most heated (and more dry) and the arrow 96 being least heated (and more moisture loaded). The arrows 92 and 94 represent greater degrees of dryness within the mid section of the bed, as temperature stratification due to a more stable heat/ purging process of tuned regeneration. To regenerate a desiccant bed, it is desirable to have 400 degrees Fahrenheit of purging air flowing into the vessel. To achieve a stable 400 degrees Fahrenheit purge set point 44, a heater discharge temperature of 430 degrees Fahrenheit would be set at temperature sensor 60 by adjusting the variable restriction 'R' until a consistent back-pressure is observed on pressure gauge 56 and the temperature stabilizes at a consistent 430 degrees Fahrenheit at the heater discharge.

Figure 5:
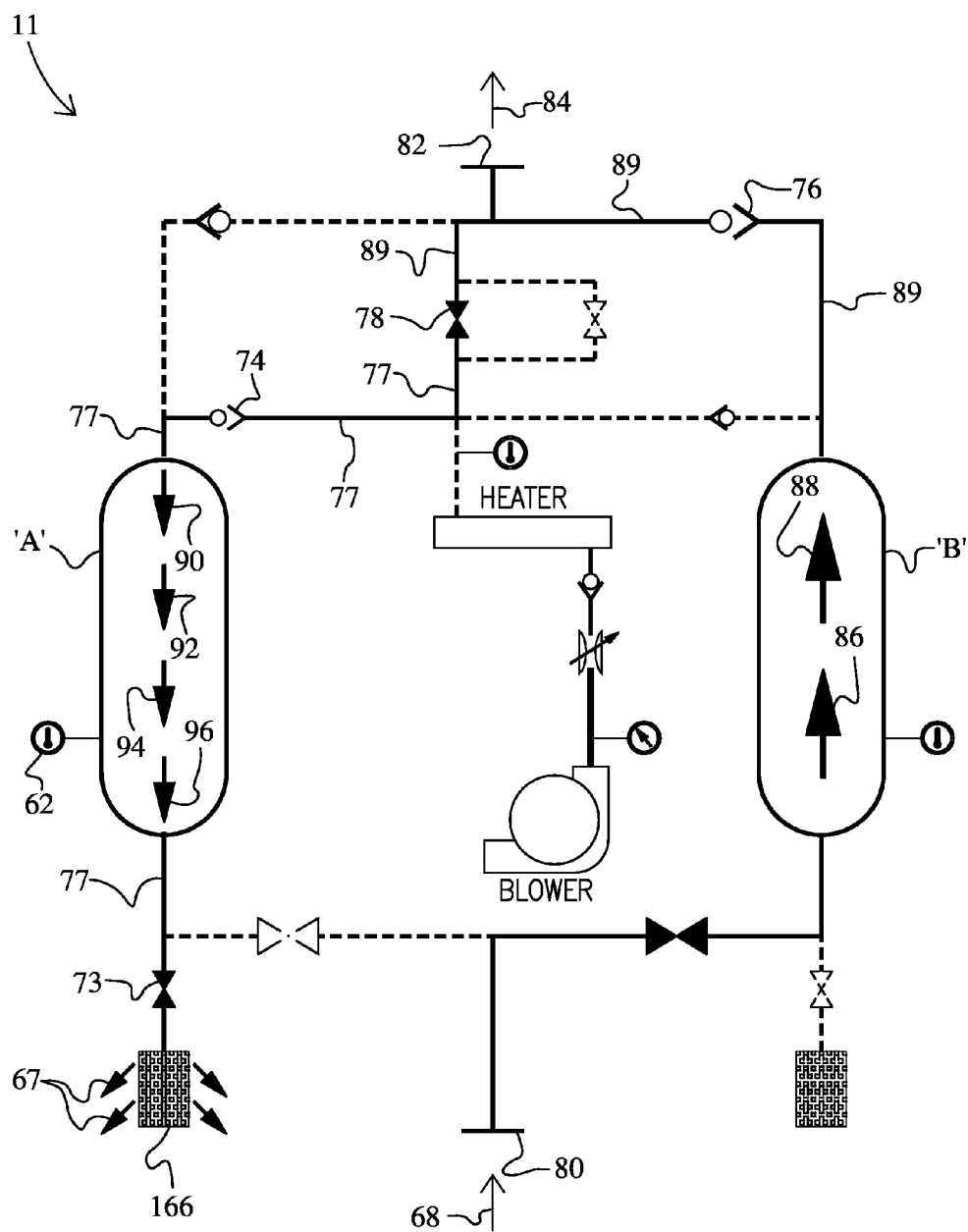
FIG. 5 is component diagram illustrating purge regeneration, configured in a dry purge phase.

When the blower 54 operation is completed, referring back to FIG. 1, the bower contactor is made inactive at blower OFF 46 reference and the dry purge is made active at the dry purge ON 48 reference (an illustration of the dry purge pathways is shown in FIG. 5). The dry purge pathway is now using a small portion or the exiting compressed air through dry purge valve 78. Note that the blower check valve 70 would be closed (because the blower is off) and the purge path is directed to tower 'A'. Parallel to the dry purge valve 78 is a repressurization valve 79. The repressurization valve would assist in bringing which ever tower was newly regenerated back up to on-line operating pressure before the half cycle time line 22 & 23 of FIG. 1 is achieved. Anyone skilled in the art of compressed air dryer operation would understand that each tower becomes either the depressurized regenerating tower vessel or the pressurized drying tower vessel by manipulation of the various inlet valves 72, exhaust valve 73 associated with each tower, and, dry purge valve 78 and repressurization valve 79.

In operation, the compressed air dryer system of the present invention 11 of FIG. 4, has started from a quiescent 'cool' state at half cycle time-line 22 (as indicated in waveforms of FIG. 1); where the illustrated temperatures (heater temperature 34, outlet temperature 36 and dew point 38) are all consistent with room temperature or cooled as would be found if the system was setting unused over night or a weekend in a factory scenario for example, and, the temperature could dissipate on their own. Note that dew point waveform 38 has no, or substantially none, dew point bump 52. This is achieved by the stable, even heating of the desiccant bed where the 400 degree Fahrenheit purge air (430 degrees at the discharge of the heater), as indicated by arrow 90, is injected consistently and penetrates effective down the bed burning-off any captive moisture on the desiccant. As the heat progresses to stratified layers within the bed, as indicated by arrow 92 at 300 degrees & 250 degree at arrow 94, the low bed temperature sensor 62 registers the progress. When, for example 200 degree Fahrenheit is achieved on sensor 62, the heater can now be turned OFF early and not operating the full time of heating phase 16. The 400 degree heat (at arrows 90 & 92) is now be pushed through the remaining bed while cool air is being injected by the blower via flow pathways 81. This early termination of the heating process, results by the proper setting of the variable restriction and stable purge temperature setting, save considerable energy and cycling wear and tear on the equipment. Further, this tuned regeneration process directly results in a 'clean' dew point, with no or very little dew point bump, when the newly regenerated tower come on-line as the dryer tower, after a half cycle time-line 23 occurs.

In FIG. 5 illustrates the pathways of the dry purge in the cooling phase 18. Where the blower has become inactive and a dry purge valve 78 opens (reference FIG. 1 and note the blower OFF 46 and dry purge ON 48 indications). A small portion of the dried compressed air pathways 89, exiting the tower 'B' flow through the dry purge valve 78 as dry purge pathways 77 and into the tower 'A'. This −40 dew point dry air continues to push the heat and any residual moisture remaining in the lower sections of the desiccant bed, (as indicated by arrows 94 & 96) and out exhaust muffler 66. When the lower bed temperature sensor reads a reduces value of under 150 degrees Fahrenheit, the dry purging process can end, further saving energy and operation cost.

It is important to understand the half cycle time lines 22 & 23 in FIG. 1, are typically 'fixed' times, such as 4 hours (with a typical heating phase 16 being ¾ of the half cycle and the cooling phase 18 being ¼ of the half cycle). In prior art, as in FIG. 2, the delineation line 120 would be 'hardwired', fixed to such a heating/cooling sequence. But the present patent allows the heating phase to terminate early (for example one hour or two hours into the phase depending on the moisture load within the desiccant bed) and advance directly to cooling. Further, due to the tuned regeneration process of stable purging temperatures, cooling actually begins within the heating phase when the bottom bed sensor 62 reads a temperature (for example 200 degrees) consistent with hotter values of 430 degrees being ejected into the inlet end of the bed and a set point 44 of 400 degrees can be ended early.

Although the delineation line 20 in FIG. 1 is shown at the ¾ time mark on the graphic illustration 10, it could effectively be anywhere along the time line of heating phase 16; directly relating to the amount of moisture loading on the desiccant bed. In such a scenario, if the delineation time line 20 where to be at only ¼ in the heating phase 16, the cooling phase would ensue immediately. And the cooling phase 18 could run the full ¼ allotted time, or terminate early by the referencing the bottom bed temperature sensor 62. The system would just wait the remaining period of time in the half cycle 12 before switching towers at the half cycle interval, saving energy.

The present invention ideally uses the ¾ to ¼ ratio and a 4 hour half cycle interval, because this is a convenient and reasonable system design. The 4 hour half cycle is driven by size of the tower containing the desiccant to maintain a drying phase dew point of typically −40 degrees. The system could be designed around a dew point, for example −100 degrees, and have all the benefits of the present patent, by adjusting the tower size desiccant mass, heater and blower capacity, etc. It is also contemplated within the present patent, that a variable speed motor drive on the blower, and/or a electronic variable solid state controller (SCR) on the heater to better stabilize set point temperature could be used. These type of devices are very expensive to purchase and install so the preferred use of a variable restriction, as taught in the present invention is highly desired and within cost-saving scope of the objectives presented.

It should be obvious to anyone skilled in the art of desiccant air dryer systems that the art being taught in the present patent can achieve significant operating cost, equipment wear and tear, and superior performance. Further, although the above listed benefits are important, the system removes the dew point bump, at tower switch-over from a regenerating cycle to a drying on-line cycle, which makes the present invention practical for manufacturing and use in industry.

While the invention has been particularly described and illustrated in detail with reference to the preferred embodiment, it should be understood by those skilled in the art that equivalent changes in form and detail may be made without departing from the true spirit and scope of the invention as claimed, except as precluded by the prior art.

What is claimed is:

1. A system for regenerating desiccant in an air dryer comprising:
    a means to variably restrict blower purge air flows to a bed of desiccant within at least one tower vessel within said air dryer; wherein said purge air flow is selectively directed to at least one vessel containing desiccant;
    a means to measure and control blower discharge flow pressures, heater outlet flow temperatures, desiccant bed bottom area temperature, dry purge for cooling, and dew point;
    said means to variably restrict blower purge air flows having adjustment capability to tune the air dryer during a heating phase of regeneration so that the vessel tower size, the mass of desiccant within the vessel, heater and blower capacity are matched;
    wherein, said variable restriction means allows for flow control and blower purging at a stable purge temperature so that the air dryer does not cycle during heating phase in regenerating the desiccant thus enabling the system to be cooled and repressurized and returned to a dryer mode cycle of operation.

2. The system for regenerating desiccant in an air dryer of claim 1, wherein said means to variably restrict blower purge air is disposed at a discharge of the blower to control blower flows by increasing or decreasing the purge air entering the heater.

3. The system for regenerating desiccant in an air dryer of claim 2, wherein said means to measure and control blower discharge flow pressures includes a discharge flow pressure measurement of purge air during the regeneration phase of operation.

4. The system for regenerating desiccant in an air dryer of claim 1, wherein said means to control said heater outlet flow temperature are disposed at the discharge of the heater to measure and control blower flow temperatures of purge air in both heating phase and cooling phase.

5. The system for regenerating desiccant in an air dryer of claim 1, wherein said desiccant bed bottom area temperature is controlled based upon a measurement of purge flows of both heating phase and cooling phase, said measurement of purge flows measures the dryness of the desiccant bed.

6. The system for regenerating desiccant in an air dryer of claim 5, wherein said measurements allow for early termination of heating and the early termination of cooling phases of operation.

7. The system for regenerating desiccant in an air dryer of claim 1 wherein the control blower discharge flow reduces moist air re-loading moist air to the bed is reduced by a dry purge valve.

8. A system for regenerating desiccant in an air dryer comprising:
    a means to variably restrict blower purge air flows to a bed of desiccant within at least one tower vessel within said air dryer; wherein said purge air flow is selectively directed to a first and a second tower vessel containing desiccant for regeneration;
    a temperature/pressure gauge to measure and control blower discharge flow pressures, outlet flow temperatures, desiccant bed bottom area temperature, dry purge for cooling, and dew point and heater outlet flow temperatures; wherein, said means to variably restrict blower purge air flows has adjustment capability to tune the heating phase of regeneration by a mechanical adjusting control making the unique system vessel tower size, the mass of desiccant within the vessel, heater and blower capacity all ideally matched which results in even stable purge temperatures;

a sensor to measure desiccant bed bottom area temperature, dry purge for cooling, and dew point; wherein, said variable restriction means allows for flow control and blower purging at a stable purge temperature so that the air dryer does not cycle during heating phase in regenerating the desiccant thus enabling the system to be cooled and repressurized and returned to a dryer mode cycle of operation.

9. The system for regenerating desiccant in an air dryer of claim 8, wherein said means to variably restrict blower purge air flows are disposed at the discharge of the blower to control blower flows of the purge air entering the dryer.

10. The system for regenerating desiccant in an air dryer of claim 9, wherein said means to variably restrict blower purge air flows is a discharge flow pressure/temperature gauge to set the purge air back-pressure during the regeneration phase of operation when the blower is operating.

11. The system for regenerating desiccant in an air dryer of claim 8 wherein said discharge flow pressure/temperature gauge is disposed at the discharge of the heater to measure blower flow temperatures of purge in both heating phase and cooling phase.

12. The system for regenerating desiccant in an air dryer of claim 8, wherein said a measurement sensor is positioned at desiccant bed bottom measure and control purge flows temperatures in both heating phase and cooling phase;

said measurement of purge flows determine the dryness the desiccant bed and are preset to signal when bottom vessel temperatures reach a predetermined set point in the heating phase to terminate heater operations, and predetermined set point in the cooling phase to terminate dry purge operations.

13. The system for regenerating desiccant in an air dryer of claim 8, wherein the flow of the blower re-loading moist air to the bed is controlled by a dry purge valve.

14. A system for regenerating desiccant in an air dryer comprising:

a means to variably restrict blower purge air flows to a bed of desiccant a within a twin tower vessel system where the first tower vessel controls regeneration and a second tower vessel controls the operation of drying; wherein said purge air flow is selectively directed to said first and said second tower vessels containing desiccant;

a means to measure and restrict blower discharge flow pressures, heater outlet flow temperatures, desiccant bed bottom area temperature, dry purge for cooling, and dew point; wherein said means to measure and restriction control are gauges set at about 70 CFM blower discharge purge flow back-pressures on a pressure gauge to about 1.7 PSI, and heater outlet purge flow temperatures to about 430° F. on a temperature gauge for a 1000 SCFM system;

said means to measure and restrict blower discharge having adjustment capability to tune the heating phase of regeneration by a mechanical adjusting control valve so the unique system vessel tower size, the mass of desiccant within the vessel, heater and blower capacity all ideally matched for stable heat regeneration which results in even stable purge temperatures;

a sensor to measure desiccant bed bottom area temperature, dry purge for cooling by dry purge valve, and to measure dew point;

wherein, said variable restriction means allows for flow control and blower purging at a stable purge temperature so that the air dryer does not cycle during heating phase in regenerating the desiccant thus enabling the system to be cooled and repressurized and returned to a dryer mode cycle of operation.

15. The system for regenerating desiccant in an air dryer of claim 14, wherein means to variably restrict blower purge air flows is disposed at the discharge of the blower to control blower flows and is a manual position valve which controls the purge air flows entering the heater.

16. The system for regenerating desiccant in an air dryer of claim 15, wherein the discharge of the blower to control blower flows includes a discharge flow pressure gauge to control the purge air back-pressure during the regeneration phase of operation.

17. The system for regenerating desiccant in an air dryer of claim 16, wherein said heater outlet flow temperature gauge is disposed at the discharge of the heater to measure and control blower flow temperatures of purge to a predetermined set point purge temperature in the heating phase.

18. The system for regenerating desiccant in an air dryer of claim 16, wherein said a sensor measures and controls desiccant bed bottom area temperature in response to purge flows temperatures in both heating phase and cooling phase to control the dryness the desiccant bed; wherein sensors are preset to signal when vessel bottom temperatures rises to about 200° F. in the heating and cooling phase to terminate heater operations.

19. The system for regenerating desiccant in an air dryer of claim 18, further comprising a means to direct the heat captivated in the top areas of the bed to be directed down to an exhaust, once the higher top vessel temperatures are lowered below a predetermined set point of about 175° F.

* * * * *